Nov. 18, 1952   V. C. BELT   2,618,396
INDUSTRIAL LIFT-TRUCK APPARATUS
Filed Jan. 12, 1951   4 Sheets-Sheet 1
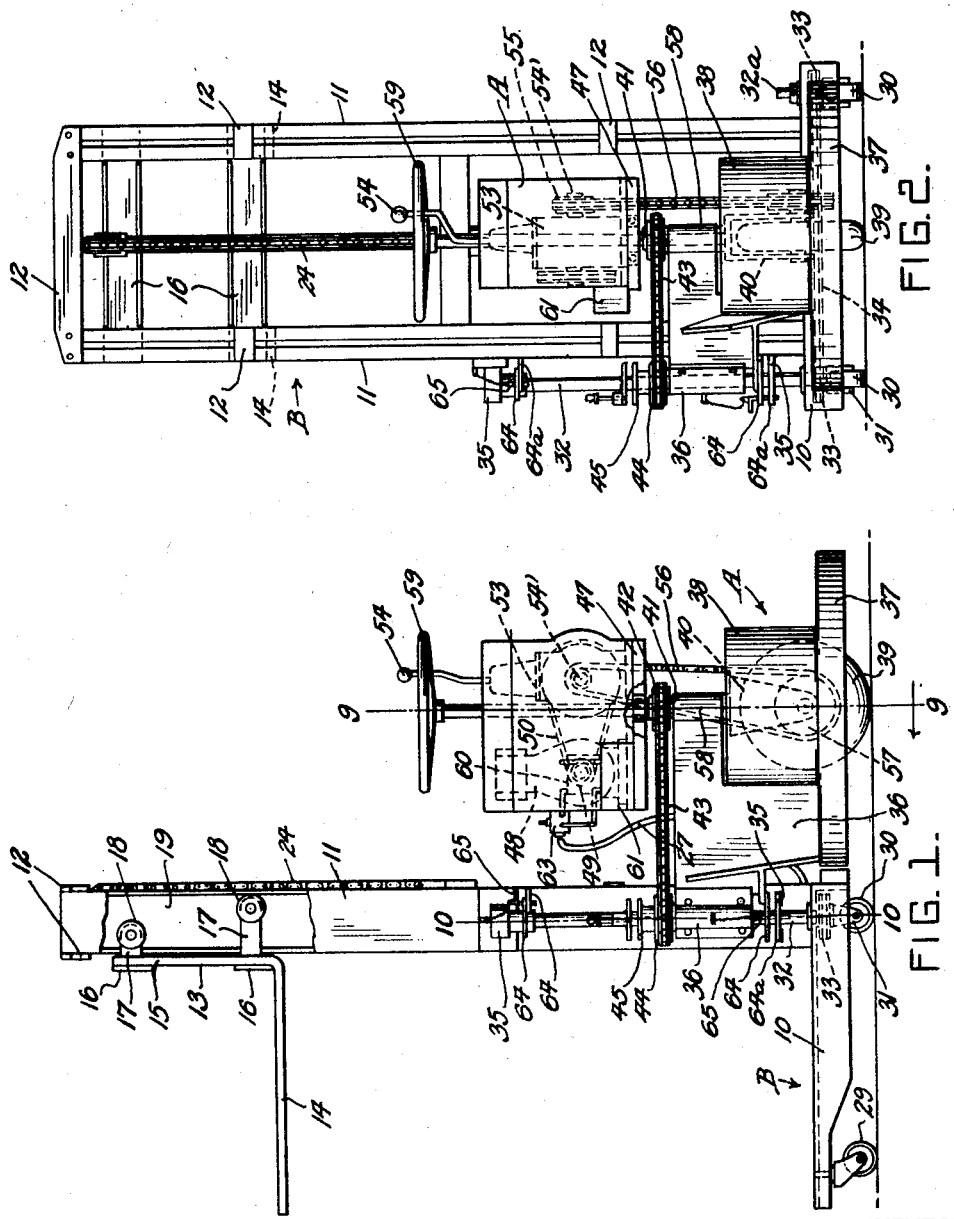
INVENTOR
Vernon C. Belt
BY
ATTORNEY Nov. 18, 1952   V. C. BELT   2,618,396
INDUSTRIAL LIFT-TRUCK APPARATUS
Filed Jan. 12, 1951   4 Sheets-Sheet 2

INVENTOR
Vernon C. Belt

BY *M. S. McDowell*
ATTORNEY

Nov. 18, 1952  V. C. BELT  2,618,396
INDUSTRIAL LIFT-TRUCK APPARATUS

Filed Jan. 12, 1951  4 Sheets-Sheet 3

INVENTOR
Vernon C. Belt

BY M. S. McDowell

ATTORNEY

Nov. 18, 1952　　　V. C. BELT　　　2,618,396
INDUSTRIAL LIFT-TRUCK APPARATUS
Filed Jan. 12, 1951　　　4 Sheets-Sheet 4

INVENTOR
*Vernon C. Belt*

BY *M. S. McDowell*

ATTORNEY

Patented Nov. 18, 1952

2,618,396

UNITED STATES PATENT OFFICE 2,618,396

INDUSTRIAL LIFT-TRUCK APPARATUS

Vernon C. Belt, Orient, Ohio, assignor to The Belt Corporation, Orient, Ohio, a corporation of Ohio Application January 12, 1951, Serial No. 205,697

7 Claims. (Cl. 214—113)

This invention relates to portable power-actuated lift-truck apparatus of the kind employed in many industries for facilitating the transportation, raising and lowering and stacking of various products, such as those contained in boxes, crates, barrels, drums, bags and other containers.

More particularly, the present invention is concerned with an improved industrial lift-truck apparatus having separate, wheel-mounted, steerable, propelling and load-handling vehicle units, and wherein means are provided for manipulating or turning supporting wheels for such units in obtaining improved steering control on the part of the apparatus.

Industrial lift trucks of conventional construction, each utilizing a four wheel base having a vertically movable power-actuated load receiver at the front thereof, are characterized by their need for considerable unobstructed floor space or operating room in enabling such trucks to negotiate turns, and to receive and discharge loads with a minimum of manipulation. Often such trucks are required to work in narrow aisleways of warehouses, particularly under conditions where such aisleways are formed between adjacent stacks of boxes or crates, and wherein the problem of providing space for the advancement, turning and other manipulations of such trucks is a very serious one. As a practical matter, the problem is normally met by providing wide avenues or aisles through which the trucks pass. However, such relatively wide aisles or bays minimize the amount of available floor space present in a building or other surface area for the stacking of goods.

It is, therefore, an object of the present invention to provide industrial lift trucks of the character indicated wherein an improved construction of such trucks is provided by means of which their movement may be controlled with greater facility, and with a smaller amount of required manipulating space.

Another object is to provide truck apparatus utilizing a propelling unit and a separate load-handling unit, whereby through manipulation of the propelling unit, means are operated to cause the load-handling unit to move in any desired direction over a floor surface and in a manner requiring but a limited amount of free space in providing for such movement.

It is another object of the invention to provide an industrial lift truck adapted for lifting and transporting long, narrow objects in and out of storage through narrow aisles.

A further object of the invention is to provide industrial lift-truck apparatus involving separable propelling and load-handling units, and wherein the load-handling unit is provided with supporting wheels turnable about vertical axes to control the direction of movement of the load-handling unit, said wheels having their operational positions governed by clutch-controlled steering mechanism operable from the propelling unit.

It is another object of the invention to provide a separable propelling unit for lift-truck apparatus, which includes a frame carrying a single supporting and driving wheel means which is turnable about a vertical axis, the said wheel means being provided with a vertically journaled stem mounted for turning movement in the frame of the propelling unit and carrying motor-driven means for imparting power to the traction wheel means of the propelling unit in effecting advance of said units over a floor or other operating surface.

For a further understanding of the invention, including additional objects and advantages thereof, reference is to be had to the following description and the accompanying drawings, wherein:

Fig. 1 is a side elevational view of lift-truck apparatus formed in accordance with the present invention;

Fig. 2 is a rear end elevational view, looking toward the rear of the propelling truck unit and its associated load-handling unit;

Referring more particularly to the drawings, there has been indicated at A the propelling truck or unit of my improved apparatus, and at B the loading or load-handling truck unit of said apparatus.

Figure 3:
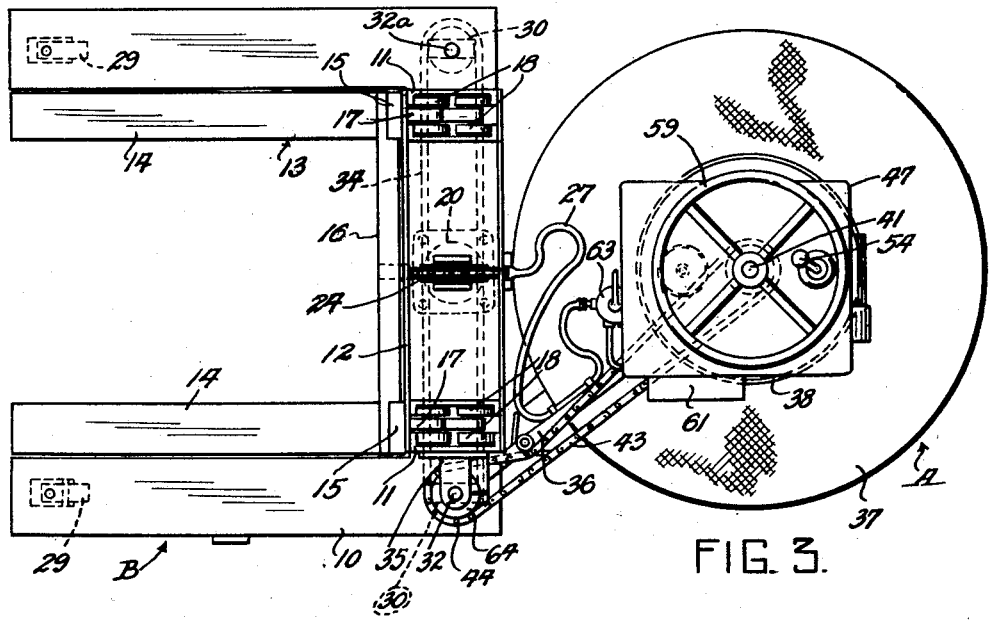
Fig. 3 is a top plan view of said units.
Figure 4:
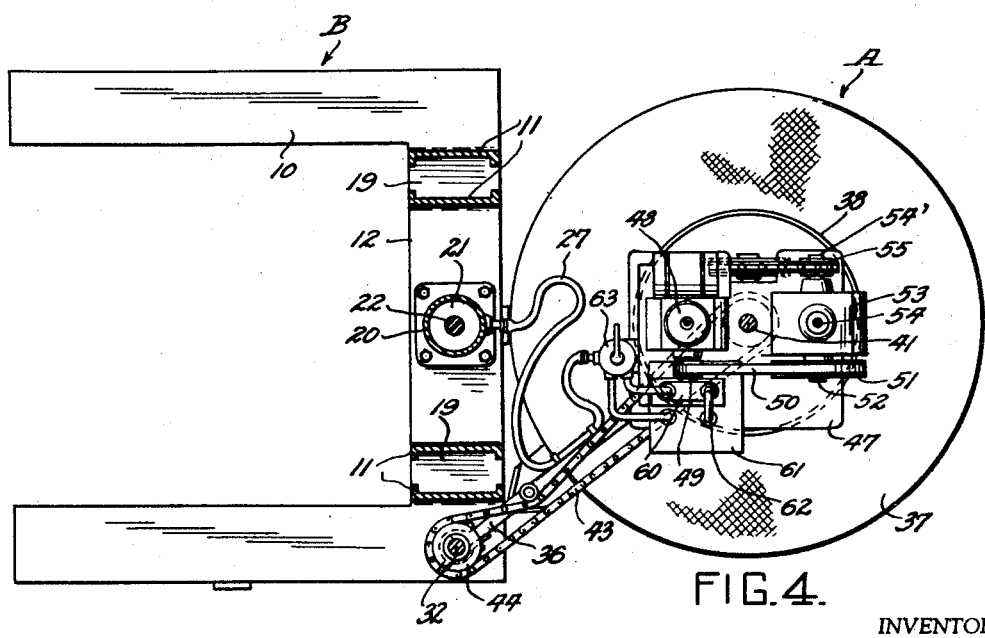
Fig. 4 is a detail horizontal sectional view, disclosing in plan the construction of the propelling unit and the rear lower portion of the load-handling unit.
Figure 5:
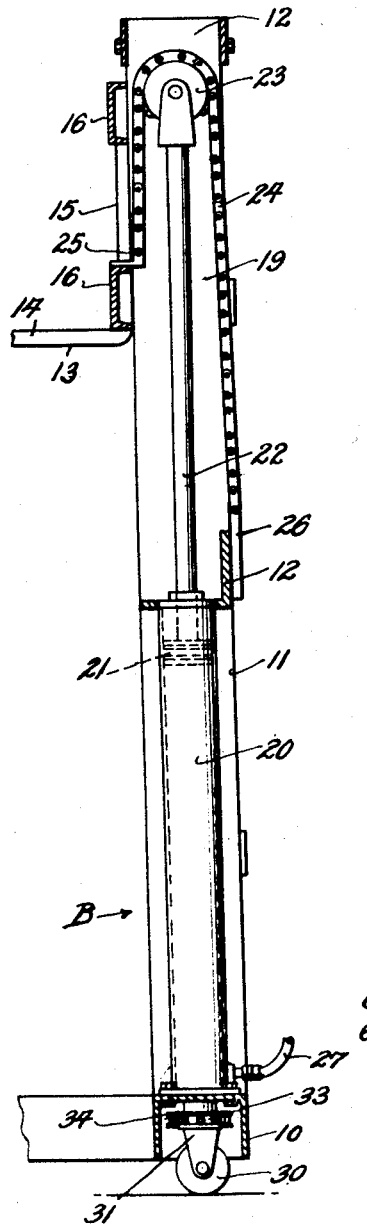
Fig. 5 is a detail vertical sectional view taken through the supporting frame of the load-handling unit, disclosing its vertically movable load-receiver and the associated mechanism for raising and lowering said receiver.
Figure 6:
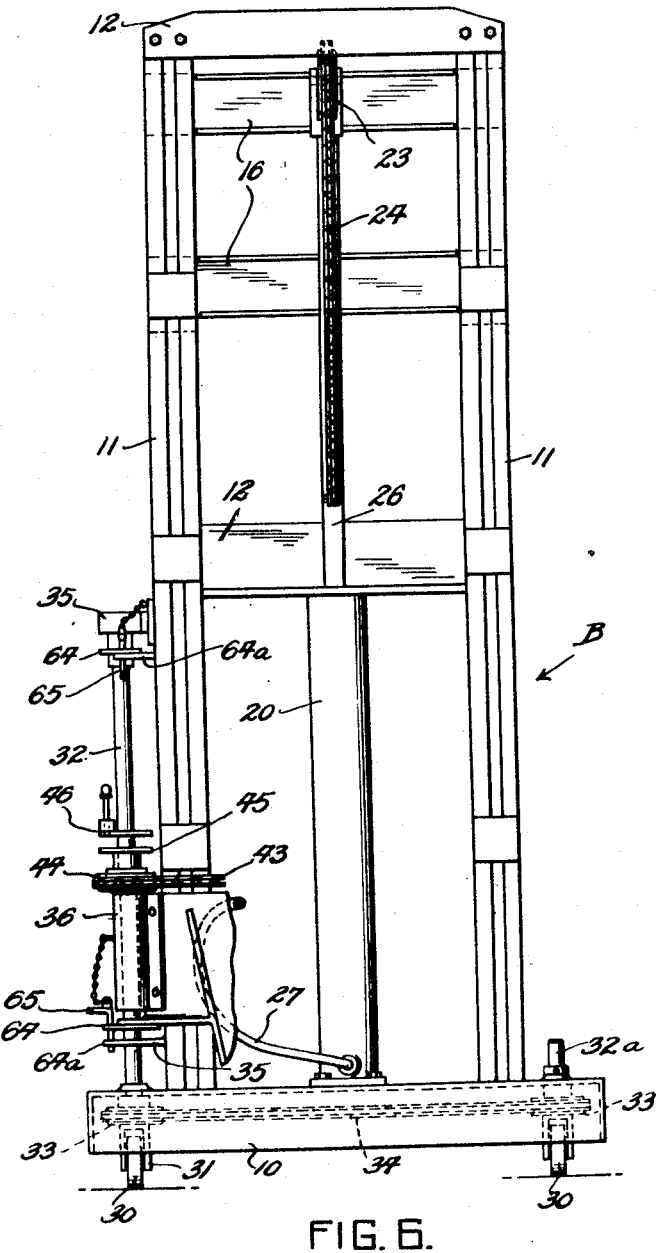
Fig. 6 is a rear elevational view of the loading unit, disclosing the same separated from the propelling unit.
Figure 9:
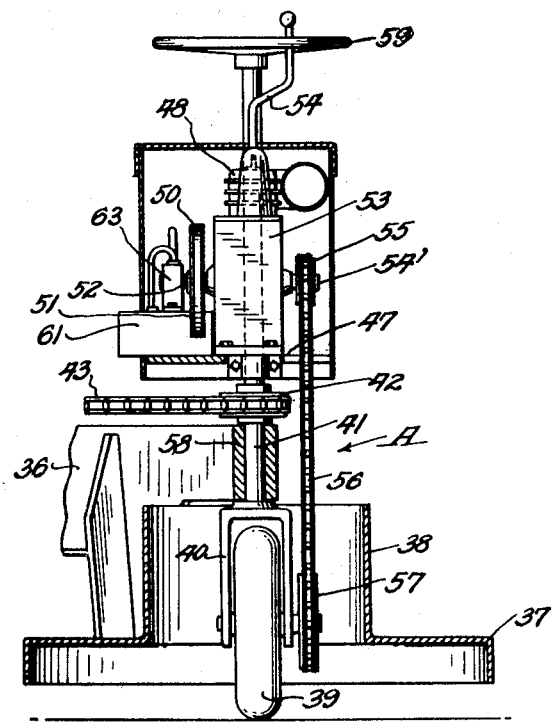
Fig. 9 is a vertical transverse sectional view taken through the tractor or propelling unit on the plane indicated by the line 9—9 of Fig. 1.

In the form of the invention, as illustrated, the unit B comprises a U-shaped base frame 10, formed from one or more inverted channel members. Arising rigidly from the base 10 is an upright elevator frame. The latter may comprise spaced, parallel, vertical members 11 joined at intervals by means of horizontally extending cross members 12. Movable vertically with respect to these members is a load-receiver or elevator 13, the latter embodying, in this instance, a pair of horizontally disposed forwardly projecting bars 14 which terminate at their rear ends in upwardly and vertically directed extensions 15 united by the cross bars 16. The extensions 15, as shown particularly in Fig. 3, are formed at inwardly directed projections 17 on which are mounted rollers 18, the latter being movable in vertical guide channels 19 provided in the members 11 of the unit B, the rollers 18 serving to guide the load-receiver, facilitating its movement in the frame members 11 with but a minimum of friction.

To raise and lower the load receiver, the elevating unit B in this instance has its frame structure provided with a vertical cylinder 20 in which is mounted for sliding movement a fluid-actuated piston 21. Connected with this piston is a rod 22 which extends upwardly and carries a sprocket 23 for rotation on its upper end. Passing around this sprocket is a link chain 24, one end of the chain being fastened as at 25 to the cross member 16 of the load receiver, while the other end of said chain is fastened as at 26 to one of the cross members 12 of the frame 11. A fluid, under pressure, is admitted into and released from the cylinder 20 through a flexible conduit connection shown at 27, the flow of fluid being under valve control from a source of fluid supply under pressure, hereinafter more fully described, to regulate at will the rise and descent of the load receiver 13.

It will be noted that the load receiver is of U-shaped formation, corresponding with the shape of the frame 10. This is done in order that the load receiver may pass between the side bars of the base frame 10 of the elevating unit B and rest directly on the floor surface 28, so that the load receiver may be readily forced under boxes, crates or other objects and suitably engaged with the latter to effect their elevation. It is, of course, within the scope of the invention to provide the load receiver with a conventional pushing device or ejector, not shown, for removing products laterally and forwardly therefrom.

In rendering the loading truck unit portable, the frame 10 thereof is provided, in the form of the invention illustrated, with a pair of freely turnable caster wheels 29, the latter being disposed at the forward end of the truck frame, as the same is viewed in Fig. 1. At the rear end of the frame 10 there is provided a pair of steering wheels 30, the latter being turnable about vertical axes and are capable of being turned about their vertical axes by power-driven means hereinafter defined. In this instance, the wheels 30 are mounted for turning movement about horizontal axes in saddles 31, which include at their upper ends vertical spindles or rods 32 and 32a, the latter each being turnable in vertical bearings provided in the frame bars 10. Each of the spindles or saddles carries a horizontally disposed sprocket wheel 33. Passing around each of these wheels is an endless link chain 34, the latter serving to cause both the steering and/or supporting wheels 30 to turn in unison with each other and in the same direction.

To turn the steering wheels 30, the rod 32 is extended vertically above the plane of the base frame 10 along one side of the elevator frame and is mounted for turning movement in brackets 35 carried by one of the vertical members 11 of the loading unit B. Turnable about the axis of the extended rod 32 is the forward end of the coupling tongue 36 of the propelling truck or tractor unit A.

The tractor unit A comprises in a preferred form of my invention a circular base 37, on which is mounted rigidly the coupling tongue 36 and a traction wheel housing shown at 38. Rotatable in the housing 38 is a floor or ground-engaging traction wheel 39, the latter being rotatable in a saddle 40. To the upper end of the latter there is secured a vertical shaft or rod 41. To this shaft or rod there is fastened a sprocket wheel 42 and around the latter there is passed a horizontally positioned endless chain 43. The forward end of this chain passes over the teeth of a sprocket wheel 44, which is loosely rotatable on the rod 32 of the loading unit B. The sprocket 44 carries, in this instance, a coupling 45, which is engageable with a pin 45a of a coupling member 46, formed with the spindle or rod 32, so that when the member 46 is joined with the hub 45 by the pin 45a, rotation may be imparted to the rod 32 from the chain 43 and the vertical shaft 41, thereby controlling the operating positions of the ground wheels 30 controlled thereby.

Fixed to the shaft 41 on which the propelling and steering wheel 39 is carried, is a motor base 47. Mounted on this base is an electric motor or a small internal combustion engine 48. In this instance, an engine has been shown, having its crank shaft equipped with a belt wheel 49 around which passes an endless belt 50, the latter leading to a belt wheel 51 which is fixed to the power input shaft 52 of a variable speed-reducing mechanism 53, the latter being provided with a conventional manual control lever shown at 54. The driven shaft 54' of the speed-reducing mechanism is provided preferably with a sprocket 55 around which passes a link chain 56, the said chain leading to a sprocket 57 fixed to the shaft of the ground-engaging propelling and steering wheel 39 of the tractor unit A.

Since the vertical rod or shaft 41 of the wheel 39 is turnable in the vertical bearing shown at 58 provided on the rear end of the tongue 36, the motor base 47 may be fixed to the shaft 41 to turn in unison therewith. Thus, the control lever 54 of the speed-reducing mechanism 53 may extend between the spokes of the hand operated steering wheel shown at 59. The latter wheel is connected to the upper end of the shaft 41 and may be manipulated to control the working positions of the wheel 39 and, if the clutch member 46 is engaged, the steering positions of the wheels 30.

The engine 48 may also be employed to drive a pump 60. In this instance, the pump draws a working fluid from a tank shown at 61, advancing the fluid under pressure through pipes 62 containing a manually operated valve 63 and back to the tank 61. In one position of operation, the valve 63 permits the fluid under pressure to pass through the flexible conduit 27 to the ram-containing cylinder 20, whereby to raise the load receiver or elevator of the unit B. In another position of operation, the valve 63 enables the fluid contained in the cylinder 20 to be returned to the tank 61, thereby providing for the controlled descent of the load receiver.

Figure 7:
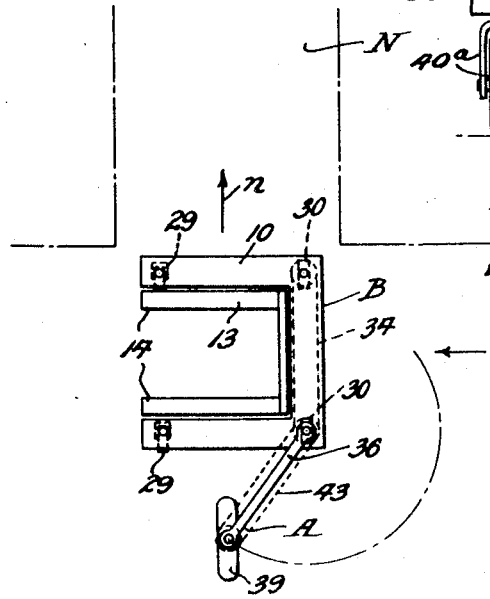
Fig. 7 is a detail plan view disclosing the orbit of adjustment of the propelling unit relative to the loading unit and disclosing the operating position of the propelling unit in moving the load-handling unit in a direction perpendicular to its longitudinal axis.

As shown more particularly in Fig. 7, the tractor or propelling unit A may turn about the vertical axis of the shaft or rod 32, and may be positively retained in any of its positions of turning movement by means of collars 64 and mating stationary flanges 64a, the latter having openings therein through which removable pins 65 pass, thus locking the propelling unit A in a definite position of operation with respect to the loading unit B.

By virtue of this construction, it will be seen that the tractor or propelling unit may push or pull the load-handling unit either longitudinally or laterally. When the units occupy the relative positions disclosed, for example, in Fig. 3, the said units may be propelled forwardly or backwardly in their order of longitudinal alignment. However, if it is desired to move the loading unit laterally, at right angles to its longitudinal axis, the propelling unit may be turned so that the same occupies the position indicated in Fig. 7 at one side of the loading unit. At the same time, the operating positions of the steering wheel 39 of the propelling unit A, and the steering wheels 30 of the loading unit B are turned when desired through the manipulation of the steering wheel 59 and clutch 46, to provide for the desired direction of travel of the loading unit independently of the relative order of the two units. With this arrangement, it will be observed that the truck apparatus is extremely portable and steerable, capable of being moved as desired and manipulated in crowded and cramped quarters advantageously. Thus with this mechanism, objects can be loaded rapidly and dexterously in a very limited amount of space; that is, spaced used normally as an aisleway between piles or stacks of stored goods or products. The propelling and loading units are readily detachable, so that if one should become out of order and require repair, another unit may be substituted for the damaged or broken unit with facility and economy.

The main drive or traction wheel 39 of the tractor unit A is carried by the rear end of the swinging coupling arm or tongue 36, the forward end of said arm or tongue being pivoted for turning movement about the vertical axis of the rod 32, the latter at its lower end carrying one of the steering wheels 30 of the fork truck or load-handling unit B. This construction permits, the main drive wheel to be positioned either at the rear or on one side of the main frame of the fork truck, as shown, for example in Fig. 7.

Figure 8:
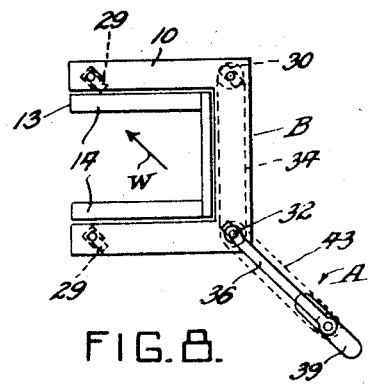
Fig. 8 is a similar view disclosing another operating position of the tractor or propelling unit with respect to the load-handling unit, wherein the tractor or propelling unit is disposed to advance the load-handling unit over the floor surface in a direction diagonal to the longitudinal axis of said load-handling unit.

The steering wheel 30 can be uncoupled or mechanically disconnected from the steering wheel 59, or operatively connected with the latter by the actuation of the sliding clutch 46. When so clutched, the wheels 30 of the unit B and the traction wheel 39 of the tractor unit A turn in unison in the same direction. Thus, as shown in Fig. 7, when it is desired to move the unit B at right angles or perpendicular to its longitudinal axis, so that it may be advanced from a wide aisle indicated at W through a narrow aisle N, the traction wheel 39 is swung so that it is disposed at one side of the frame 10 of the unit B, and power is applied to the wheel 39 from its associated motor unit so that the fork truck will be advanced in the direction indicated by the arrow n through the aisle N. Similarly, diagonal movement of the fork truck may be accomplished by positioning the propulsion unit A and its drive wheel 39, as shown in Fig. 8. Since the wheels 30 automatically assume the same position as the wheel 39 when the clutch 46 is operatively engaged with the member 44, the truck apparatus may be advanced in the direction indicated by the arrow w. Usually, the turning of the wheels 30 and 39 in a desired direction is all that is required in steering, and this may be done independently of the relative operating positions of the two units.

With this mechanism, it is possible to maneuver the trucks into locations and handle loads which are not possible with other industrial lift trucks of which I am aware. It will be observed that the power unit A is pivoted so that essentially it can be moved into a position where it does not require any added width or manipulating room in the direction of travel of the load-carrying unit undergoing movement thereby. Again, the connection of the three steering wheels, indicated at 30 and 39, is such that maximum maneuverability can be obtained under all operating conditions, reducing substantially aisle width necessary in the operation of portable load-handling equipment of the character set forth.

Figure 10:
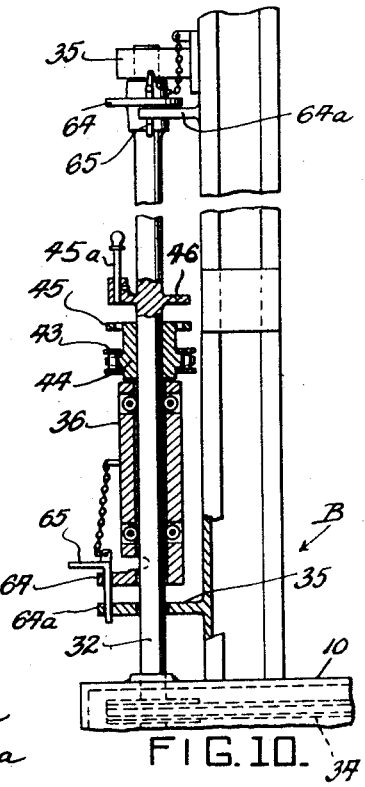
Fig. 10 is a similar view taken on the line 10—10 of Fig. 1, and disclosing the clutch-controlled apparatus for regulating the steering action of the load-handling unit.
Figure 11:
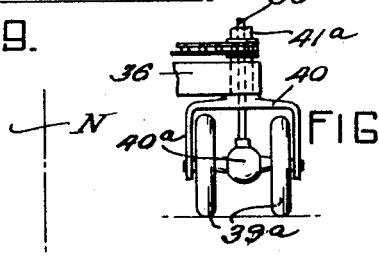
Fig. 11 is a detail elevational view of a modified form of steering and driving wheel means for the propelling unit of the apparatus.

As shown in Fig. 10, the sleeve 36 is slidable in the shaft 32 to permit the traction wheels of the two units to follow the contour of uneven flooring, allowing independent vertical movement between the two units as at ramp and floor intersections. In Fig. 11, a dual traction wheel structure is shown at 39a, the same being supported for rotation in the lower end of the yoke 40. In this construction, a conventional differential 40a may be used in driving the dual wheels. Such wheels serve to provide greater tractive effort than a single wheel. In this dual wheel construction, the drive shaft, indicated at 56a, passes axially through the center of the sleeve 41a with which the yoke 40 is joined.

I claim:

1. Industrial lift-truck apparatus, comprising: separate propelling and load-handling units, said load-handling unit including a frame, floor-engaging wheels effecting portable support of said frame, means journalling at least a pair of said wheels to said frame for turning movement in unison about substantially vertical axes, said propelling unit including a base, a coupling tongue on said base, means pivotally uniting the forward end of said tongue to one side of the frame of said load-handling unit for horizontal turning movement about a substantially vertical axis, a traction wheel for the base of said propelling unit, a vertically disposed operating shaft carrying said traction wheel at its lower end, journalling means for said shaft mounted on said base and providing for turning movement thereof and said traction wheel about a substantially vertical axis, an engine unit, motion-transmitting means driven by said engine for imparting rotary power to said traction wheel, and clutch-controlled means operated by turning movement of said shaft to impart turnable steering movement to the joined supporting wheels of said load-handling unit.

2. Industrial lift-truck apparatus, comprising separate propelling and load-handling units, each of said units including a frame, floor-engaging wheels effecting portable support of the frame of said load-handling unit, means carried by the frame of said load-handling unit for journalling at least a pair of said wheels on the frame for turning movement in unison about substantially vertical axes, a traction wheel carried by the frame of said propelling unit, means for imparting rotary power to said traction wheel, said last-named means being carried by said propelling unit, means on the frame of said propelling unit for effecting turning movement of said traction wheel about a substantially vertical axis, means pivotally coupling the frame of said propelling unit with one side of the frame of said load-handling unit, and clutch-controlled means operated by turning movement of the traction wheel about a substantially vertical axis for imparting coordinated turning movement to the floor-engaging wheels of said load-handling unit.

3. Industrial lift-truck apparatus, comprising: separate propelling and load-handling units, each of said units including a frame and the frame of said load-handling unit being substantially rectangular, a pair of supporting and steering wheels carried by the frame of the load-handling unit adapted for turning movement about substantially vertical axes, a traction wheel carried by said propelling unit for turning movement in the frame of said propelling unit about a substantially vertical axis, power-driven means for rotating said traction wheel about a horizontal axis, coupling means pivotally connecting the frame of said propelling unit with the frame of said load-handling unit substantially at one corner of the latter and providing for independent swinging movement of said propelling unit in a horizontal plane around said one corner of the frame of said load-handling unit, and clutch-controlled means operable upon turning movement of said traction wheel about its vertical axis for imparting corresponding movement to the steering and supporting wheels of said load-handling unit.

4. Industrial lift-truck apparatus, comprising: a load-handling unit including a frame having a horizontal base portion and an upright elevator-receiving portion, a propelling unit including a base frame, a tongue extension formed with the base frame of said propelling unit having the forward end thereof coupled for pivotal movement to one side of the elevator portion of the frame of said load-handling unit and permitting of swinging movement of said propelling unit in a horizontal plane without moving said load-handling unit, a pair of supporting and steering wheels carried by the base portion of the frame of said load-handling unit, means mounting said wheels for turning movement in unison about substantially vertical axes, an engine-driven traction wheel carried by said propelling unit, means carried by the frame of said propelling unit for journalling said traction wheel for turning movement about a substantially vertical axis, and clutch-controlled means operable in unison with the turning movement of said traction wheel about its vertical axis for imparting corresponding turning movement to the supporting wheels of the load-handling unit.

5. Industrial lift-truck apparatus, comprising: separate propelling and load-handling units, said load-handling unit including a base frame, floor-engaging steering and supporting wheels journaled in said base frame for turning movement about horizontal and vertical axes, an elevator frame arising vertically from the base frame of said load-handling unit, a base frame for said propelling unit, a traction wheel carried by the frame of said propelling unit, means supporting the traction wheel for turning movement about both horizontal and vertical axes, engine driven means for imparting power to said traction wheel, coupling means uniting the frame of said propelling unit with one side of the elevator frame of said load-handling unit and providing for independent swinging movement of said propelling unit with respect to said load-handling unit, and means operable upon turning movement of the traction wheel of said propelling unit for imparting corresponding turning movement to the supporting wheels of said load-handling unit.

6. Industrial lift-truck apparatus, comprising: separate propelling and load-handling units, said load-handling unit including a horizontal base frame and an upstanding elevator frame, floor-engaging wheels on said base frame effecting portable support of said load-handling unit, means journalling at least a pair of said wheels to said base frame for turning movement in unison about substantially vertically disposed axes, a base frame for said propelling unit, a coupling tongue on the last-named base frame having a forward end pivotally connected to one side of the elevator frame of the load-handling unit and joined for horizontal turning movement about a substantially vertical axis, a single traction wheel carried by the base frame of said propelling unit in approximately the center thereof, a vertically disposed operating shaft having its lower end formed to carry said traction wheel, journalling means for said shaft mounted on said propelling unit base frame providing for turning movement of the traction wheel and its shaft about a substantially vertical axis, an engine unit mounted bodily on said shaft for turning movement in unison therewith, motion-transmitting means driven by said engine unit for imparting rotating power to said traction wheel to effect propulsion of both of said units over a floor surface, and means operated by turning movement of said shaft in imparting turnable steering movement to the associated traction wheel to transmit coordinated turning movement to the supporting wheels of said load-handling unit.

7. Industrial lift-truck apparatus comprising a motor-driven tractor unit, a separate portable load-handling unit, a pair of supporting and steering wheels carried by said load-handling unit, means uniting said wheels for turning movement in unison, a coupling tongue projecting from said tractor unit, means pivotally connecting the forward end of said tongue to one side of said load-handling unit to provide for swinging movement of the tractor unit through an arc of substantially 180 degrees with relation to said load-handling unit and without moving said load-handling unit, a combined steering and drive wheel carried by said tractor unit, manually operated means on said tractor unit for turning said combined steering and driving wheel, and clutch-controlled means for causing turning movement, at will, of the supporting wheels of said load-handling unit in unison with the wheel of said tractor unit.

VERNON C. BELT.

REFERENCES CITED

The following references are of record in the file of this patent:

UNITED STATES PATENTS

| Number | Name | Date |
|---|---|---|
| 1,952,730 | Remde | Mar. 27, 1934 |
| 2,284,237 | Stevenson | May 26, 1942 |
| 2,327,583 | Framhein | Aug. 24, 1943 |
| 2,370,866 | Lewis | Mar. 6, 1945 |
| 2,377,389 | Waters | June 5, 1945 |
| 2,395,345 | Schreck | Feb. 19, 1946 |
| 2,448,176 | Funk | Aug. 31, 1948 |
| 2,564,002 | Gibson | Aug. 14, 1951 |